UNITED STATES PATENT OFFICE.

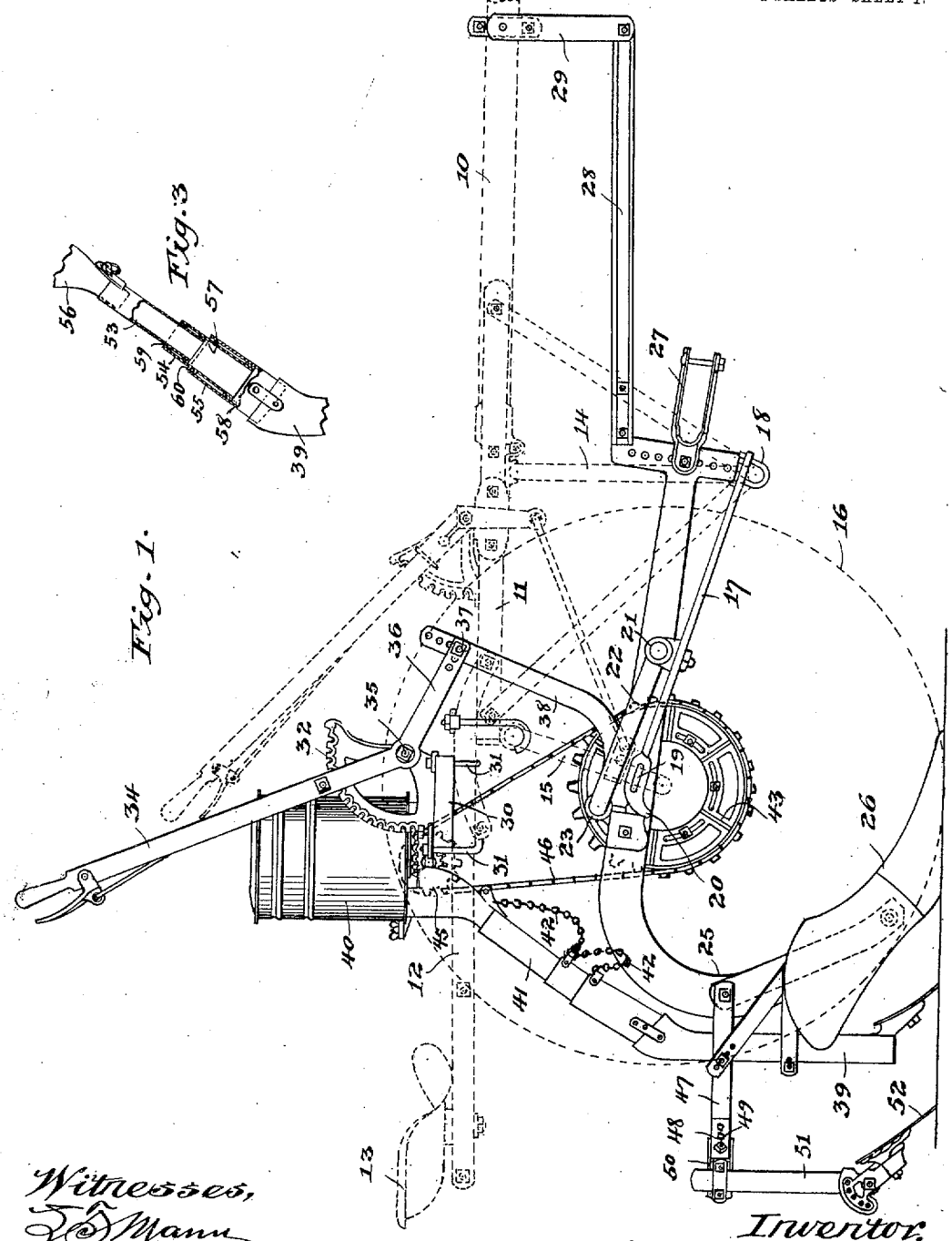

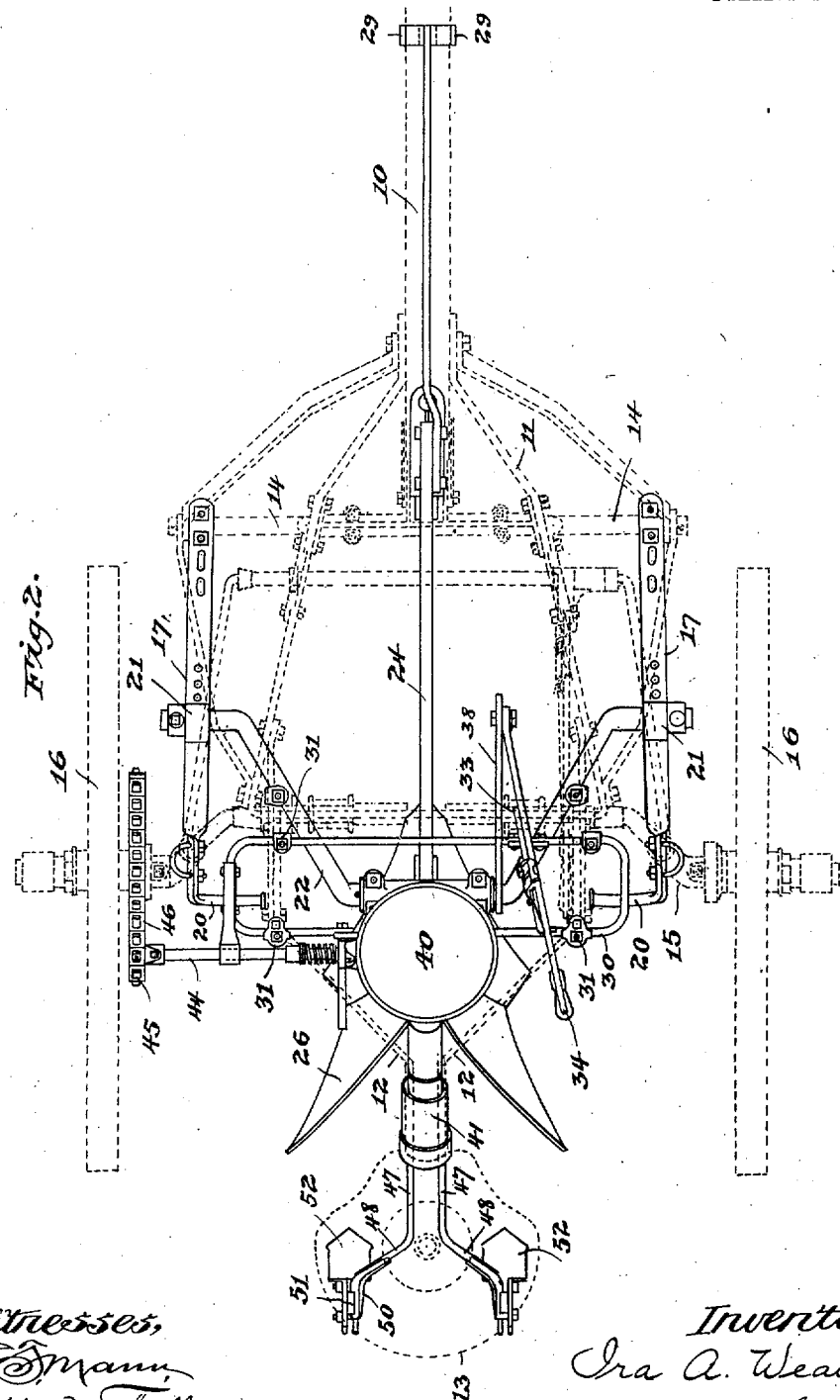

IRA A. WEAVER, OF SPRINGFIELD, ILLINOIS, ASSIGNOR TO RACINE-SATTLEY COMPANY, OF SPRINGFIELD, ILLINOIS, A CORPORATION OF ILLINOIS.

PLANTER.

No. 867,625.   Specification of Letters Patent.   Patented Oct. 8, 1907.

Application filed December 3, 1906. Serial No. 346,068.

*To all whom it may concern:*

Be it known that I, IRA A. WEAVER, a citizen of the United States, residing at Springfield, in the county of Sangamon and State of Illinois, have invented certain new and useful Improvements in Planters, of which the following is a specification.

My invention pertains to planters, and more particularly to riding middle breakers and planters, and relates to a complete riding machine for performing the planting operation, or to an attachment whereby a cultivator may be converted into a planter or lister, as it is sometimes called. Its main object is the production of a riding planter, preferably two-wheeled, with the sweep or middle breaker positioned so as to throw the dirt back of the wheels thereby avoiding the heavy draft occasioned by turning the earth in front of the wheels, and having the operator's seat back of the seed box so that the details of the action of the dropping mechanism may be readily ascertained at all times by the driver.

My invention contemplates the placing of the seed box and seed dropping mechanism comparatively high on the frame whereby sand or dirt cannot interfere with their proper actuation. Because of this construction a machine of this type is suitable for use in a field of standing stalks or on ground with hard roots. "Pitching" is prevented and the capability of planting the seed at a uniform depth under all conditions is secured by using a long bar or arm projecting from the forward end of the plow beam and connecting the same in advance of the clevis to the tongue or pole by swinging straps or links to secure a substantially parallel motion of the plow beams. By making the seed tube telescoping and capable of a considerable contraction and elongation in length the tube may readily adapt itself to the position of the sweep or middle breaker when raised to any height or thrown in the ground to any suitable depth.

In the accompanying drawings I have illustrated the preferred embodiment of my invention which comprises an attachment adapted to be detachably secured to a cultivator frame. On the figures of these drawings for the sake of clearness the parts of the cultivator have been shown in dotted lines and the attachment or planting mechanism in full lines.

Figure 1 is a side elevation of a cultivator frame equipped with my planting attachment, the pole being broken away; Fig. 2 is a plan view of the structure shown in Fig. 1; Fig. 3 is a fragmentary view showing a modified form of telescoping seed-conducting tube.

Before the planting attachment can be secured to the frame of a riding cultivator it is necessary to remove the beams, lift levers, and double tree, leaving among other parts the tongue 10, hounds 11, seat bars 12, seat 13, coupling arch 14, the offset or arched axle 15, and carrying wheels 16. The planting attachment includes two side bars 17 detachably secured by U-bolts at their forward ends at 18 to the outwardly projecting ends of the coupling arch 14, and likewise detachably secured at their rear ends 19 to axle 15, the latter by these connections being rigidly held in position. The back ends of these two side bars 17 are offset inwardly to provide foot rests or stirrups 20. On the upper side of each of these bars 17 near its center and adjustable longitudinally thereon is a swivel bearing 21 within which is mounted a bail 22 having its offset portion rotatably mounted in a bearing 23 on the top of a central plow or breaker beam 24 whose rear end is curved or bent downwardly at 25 and is equipped with a plow or middle breaker 26. A vertically adjustable clevis 27 is fastened to the front of plow beam 24, and also secured to this front end and projecting forwardly a considerable distance beyond the draft clevis is a bar 28 whose forward end is supported from tongue 10 by a pair of depending links 29 pivoted to the pole or tongue and to the bar, the upper ends of these links straddling the tongue. The parts described above comprise the entire supporting means for the plow and beam.

A substantially rectangular frame 30 is detachably fastened to seat bars 12 by bolts 31 which are offset or hooked over at their lower ends to engage beneath the lower edges of the seat bars. This frame 30 has mounted thereon a segmental rack 32 with which coöperates a pawl or locking dog 33 on a lifting lever 34 pivoted at 35 on a portion of the segmental rack. Lifting lever 34 is in reality a bell crank having the portion 36 projecting beyond fulcrum 35, and the outer end of this arm 36 is adjustably connected at 37 to a link 38 whose lower end encircles bail 22. It will be apparent that by pulling down lifting lever 34, first releasing the locking dog or pawl 33, the beam and middle breaker 26 may be readily raised and maintained at any height desired.

Mounted on the plow beam back of the middle breaker or plow 26 is a substantially vertical seed spout 39 which communicates with the seed box 40 on frame 30 by means of a telescoping tube 41 comprising three sections chained together at 42 to prevent separation. The uppermost of these chains is fastened to a fixed part beneath the seed box and to the middle section of the tube, while the other chain connects the lowest and middle sections permitting a lengthening and shortening of the tube and preventing undue elongation or separation of the sections. The operating mechanism of the seed-dropping device comprises among other parts a sprocket wheel 43 detachably secured to the spokes of one of the cultivator carrying wheels 16 concentric with the axis. The seed-feeding device also includes a shaft 44 having at its outer end a sprocket wheel 45 connected to the sprocket wheel 43 by chain 46 whereby the rotation of the carrying wheel is transmitted to shaft 44 to actuate the seed-feeding mechanism the details of which need not here be set forth, since any construction of the usual and ordinary type may be employed for this purpose.

Extending rearwardly from the bent end 25 of plow beam 24 are a pair of arms or bars 47 whose back ends are bent outwardly at 48 so as to diverge. These portions spreading apart are provided with a number of holes 49 through any one of which a bolt may be passed to fasten in place the adjustable bracket 50 secured to the upper end of one of the shanks 51 of the covering shovels 52. It will be apparent that by adjusting the brackets 50 inwardly or outwardly on the portions 48 of arms 47 the distance between the covering shovels 52 may be varied at will.

Since nearly all of the standard types of cultivators are of substantially the same size and proportions, by making the connecting means of the various parts of my attachment frame adjustable it can be applied to any of the cultivators on the market, first, however, removing the gangs, lifting levers and double-tree.

The principal feature of my invention is the provision of a two-wheeled machine adapted for planting with the middle breaker located in such position that it throws the dirt behind the carrying wheels and with the seat of the operator behind the seed box so that the operation of the feeding mechanism can be readily observed. Another feature of my invention is the forward extension from the plow beam projecting a considerable distance beyond the clevis and the connection of the same by swinging links to the tongue whereby a substantially parallel motion of the beam and attached parts is insured in raising and lowering, thus preventing pitching and allowing the planting of seed at a uniform depth under all conditions. Other features of my invention are the adjustability of the covering shovels, described above, and the three telescoping members of the seed tube which permit the latter to contract and elongate a considerable amount to compensate for the raised or lowered position of the plow and beam.

In Fig. 3 there is illustrated a modified form of seed spout or tube which includes a plurality of interfitted telescoping sections 53, 54, and 55, connecting the hopper at the top with the substantially vertical discharge spout 39. The upper end of section 53 is secured in any desirable manner to the fixed top section 56, and the lower ends of sections 53 and 54 are each fitted with a surrounding or encircling band or ring 57 and 58 respectively, while the upper ends of sections 54, and 55 are each provided with a similar internal ring or band 59 and 60 respectively. As will be readily understood these bands or rings coöperate to prevent separation of the spout sections a the same time allowing the spout or tube as a whole to elongate or shorten as occasion demands.

Although the invention has been illustrated and described as embodied in an attachment for a cultivator, or other riding mechanism having a suitable frame, it is to be understood that the features of my invention may be embodied in a complete riding planter wholly distinct from any detachable attachment.

I claim:—

1. In a two wheeled machine of the character described, the combination of a frame, carrying wheels, a plow or middle breaker located to throw the dirt back of said wheels, an operator's seat, and a seed box and feeding mechanism, said seat being located in the rear of said feed box and feeding mechanism, whereby the operator can at all times observe the operation of the feeding mechanism substantially as described.

2. In a two wheeled planter, the combination of a frame, a pair of carrying wheels, a plow or middle breaker located to throw the dirt back of said wheels, an operator's seat, and a seed box and feeding mechanism mounted on said frame, said seat being located in the rear of said seed box and feeding mechanism, whereby the operator can at all times observe the operation of the feeding mechanism substantially as described.

3. A planting attachment adapted to be detachably fastened to a cultivator frame equipped with carrying wheels, said attachment including a seed-dropping device, a plow or middle breaker, and means for supporting said device and plow on the cultivator frame substantially as described.

4. A planting attachment adapted to be detachably fastened to a cultivator frame equipped with a coupling arch, an axle, and carrying wheels, said attachment including bars adapted to be secured to said coupling arch and axle, a middle breaker, a beam supporting said middle breaker, a bail supporting said beam and mounted on said bars, and a seed-dropping mechanism, substantially as described.

5. A planting attachment adapted to be detachably fastened to a cultivator frame equipped with a coupling arch, an axle, and carrying wheels, said attachment including bars adapted to be secured to said coupling arch and axle, each of said bars having one end bent to form a foot rest, a middle breaker, a beam supporting said middle breaker, and a member mounted on said bars supporting said beam, substantially as described.

6. A planting attachment adapted to be detachably fastened to a cultivator frame equipped with a coupling arch, an axle, and carrying wheels, said attachment including means adapted to be secured to said coupling arch and axle, a middle breaker, a beam supporting said middle breaker, and a bail adjustably mounted on said means and supporting said beam, substantially as described.

7. In a machine of the character described, the combination of a frame, a pole or tongue, a plow beam, a bail supporting said beam and connecting it to said frame, a draft clevis on said beam, an arm forming an extension of said plow beam projecting forwardly past said draft clevis, and means connecting the front end of said arm to said pole or tongue, substantially as described.

8. In a machine of the character described, the combination of a frame, a pole or tongue, a plow beam, a plow, a bail supporting said beam and connecting it to said frame, a draft clevis on said beam, an arm forming an extension of said plow beam projecting forwardly past said draft clevis, and one or more links pivoted to said pole or tongue and to the front end of said arm, substantially as described.

9. A planting attachment adapted to be fastened to a cultivator frame, said attachment including a plow beam, a plow mounted on said beam, a bail partially supporting said beam, a draft clevis on said beam, an arm forming an extension of said plow beam projecting forwardly past said draft clevis, and means adapted to connect the front end of said arm to the pole or tongue of the cultivator, substantially as described.

10. In a planting attachment adapted to be detachably fastened to a cultivator frame, the combination of a frame, a seed-dropping mechanism mounted on said frame, a plow or breaker, a plow beam, a bail connecting said plow beam to said cultivator frame, a lifting lever and connections adapted to raise or lower said plow beam and plow, substantially as described.

11. In a planting attachment adapted to be detachably fastened to a cultivator frame, the combination of an adjustable plow beam, a plow or breaker carried by said beam, means for supporting said plow beam and plow on the cultivator frame, a seed-feeding mechanism mounted thereon, and a telescoping tube for conveying the seed from said seed-feeding mechanism, substantially as described.

12. A planting attachment adapted to be detachably fastened to a cultivator frame, said attachment including a frame, a seed box thereon, a seed-feeding mechanism for said box, and a plow beam lifting lever pivotally mounted on said attachment frame, substantially as described.

13. A planting attachment adapted to be detachably fastened to a cultivator frame, said attachment including a frame having mounted thereon, a seed-box, seed-feeding mechanism, a plow-beam lifting lever, a segmental rack, and a locking dog on said lever coöperating with said segmental rack, substantially as described.

14. In a planting machine, the combination of a plow or breaker, a plow beam, a pair of rearwardly extended arms fastened to said plow beam, a portion at least of said arms being divergent, covering shovels having shanks, and means adjustably connecting said shanks to the divergent portions of said arms whereby the distance between said shovels may be varied, substantially as described.

IRA A. WEAVER.

Witnesses:
C. E. GILTNER,
C. F. CLAPP.